United States Patent
Karp et al.

(10) Patent No.: US 12,045,672 B2
(45) Date of Patent: Jul. 23, 2024

(54) SYSTEM AND METHOD FOR MAPPING DATA FROM ONE ORGANIZATION'S COMPUTER APPLICATION TO ANOTHER ORGANIZATION'S COMPUTER APPLICATION

(71) Applicant: HIREDSCORE INC., New York, NY (US)

(72) Inventors: Rachel Athena Karp, New York, NY (US); Dima Shugla, Tel Aviv (IL); Yotam Manne, Tel Aviv (IL)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 17/572,671

(22) Filed: Jan. 11, 2022

(65) Prior Publication Data
US 2023/0222011 A1 Jul. 13, 2023

(51) Int. Cl.
*G06F 9/54* (2006.01)
(52) U.S. Cl.
CPC .................................. *G06F 9/541* (2013.01)
(58) Field of Classification Search
None
See application file for complete search history.

(56) References Cited

U.S. PATENT DOCUMENTS

| | | | | |
|---|---|---|---|---|
| 6,424,969 | B1 * | 7/2002 | Gruenwald | G06F 16/2365 707/E17.058 |
| 2005/0262008 | A1 * | 11/2005 | Cullen, III | G06Q 40/04 705/37 |
| 2012/0310997 | A1 * | 12/2012 | Delucchi | G06F 8/61 707/811 |
| 2014/0059054 | A1 * | 2/2014 | Liu | G06F 16/313 707/742 |
| 2014/0108461 | A1 * | 4/2014 | B'Far | G06F 16/211 707/794 |
| 2015/0269512 | A1 * | 9/2015 | Wartel | G06Q 10/06393 705/7.39 |
| 2017/0177703 | A1 * | 6/2017 | Liu | G06F 16/285 |
| 2019/0392293 | A1 * | 12/2019 | Bertrand | G06K 9/6262 |

\* cited by examiner

*Primary Examiner* — Chat C Do
*Assistant Examiner* — William C Wood
(74) *Attorney, Agent, or Firm* — PEARL COHEN ZEDEK LATZER BARATZ LLP

(57) ABSTRACT

Mapping data from a first computer application to a second computer application by obtaining a second organization's application schema with data, generating a mathematical representation of the field keys and the data in the data fields of the second organization's application, extracting data from a first organization's application; processing the data from the first organization's application and data from the second organization's application, and mapping data from the first organization's application into the second organization's application schema.

17 Claims, 3 Drawing Sheets

SYSTEM AND METHOD FOR MAPPING DATA FROM ONE ORGANIZATION'S COMPUTER APPLICATION TO ANOTHER ORGANIZATION'S COMPUTER APPLICATION

FIELD

The invention relates generally to computerized processes for mapping information from one organizational application to another.

BACKGROUND

Hiring the right applicants, employees or project workers is one of the biggest challenges for every organization, from multi-national organizations to restaurant chains. Larger organizations naturally recruit more employees and workers, and receive more resumes of candidates for open positions. The resumes may be received via the organizations' websites, email, or via other applications, mainly digital applications that send the resumes over the internet, for example to the organizations' Applicant Tracking System (ATS), Candidate Relationship Management System (CRM), or Vendor Management System.

Various organizations use different ATS software systems, while seeking similar processes be performed on the data submitted or stored in the ATS applications. In addition, different organizations may use the same ATS application differently. For example, assigning different names to the same data field, or assigning names to data fields which are irrelevant to the content stored in the field, such as naming a data field "*Q*3n**ZF*" instead of "last name". This problem may arise in other software-based applications, in addition to ATS applications.

As the number of data fields in these applications may be several hundreds, if not more, human labor of mapping the data fields for each customer increases error rates, expands quality concerns around inconsistency and data understanding, increases the time and integration cost of a new client, and adds more cost of IT ownership and support in an application that provides services on the data stored in these applications. There is hence a long felt need for automating the process of mapping data fields from one application to another application.

SUMMARY

In one aspect of the invention a computer implemented method is provided for mapping data from a first computer application to a second computer application, the method including obtaining a second organization's application schema with data, generating a mathematical representation of the field keys and the data in the data fields of the second organization's application, extracting data from a first organization's application, processing the data from the first organization's application and data from the second organization's application, and mapping data from the first organization's application into the second organization's application schema.

In some cases, the first computer application is an Applicant Tracking System (ATS), a CRM (Candidate Relationship Management), a HCM (Human Capital Management), a LMS (Learning Management System) or a VMS (Vendor Management System).

In some cases, the schema defines at least one of a number of data fields in the second computer application, interrelations between the data fields, names of the data fields, and technical requirements of the data fields with data. In some cases, the processing includes comparing a mathematical representation of the first organization's application with the mathematical representation of the second organization's application.

In some cases, the mapping includes matching data fields in the first organization's application to a data field in the second organization's application.

In some cases, the mapping of data includes mapping of data from multiple raw fields in the first organization's application into a single field in the second application's application.

In some cases, the method further includes generating a mathematical representation of the field keys and the data in the data fields of the first organization's application.

In some cases, generating the mathematical representation of the field keys and the data in the data fields of the first organization's application includes creating a vector according to a distribution of words that appear in values of the field keys and the data in the data fields and counts of the words.

In some cases, the method further includes executing a first similarity function between the mathematical representation representing field keys of the first organization's application and the mathematical representation representing field keys of the second organization's application, executing a second similarity function between the vector representing data in data fields of the first organization's application and the vector representing data in data fields of the second organization's application, applying a function receiving as input the outputs of the similarity functions to determine which data field of the first organization's platform matches a data field of the second organization's platform.

In some cases, at least one of the first similarity function and the second similarity function is a cosine similarity function. In some cases, mapping at least two different field types. In some cases, the method further includes optimizing the mapping process between the first organization's application and the second organization's application. In some cases, the optimizing is a global optimization of fields mapping.

In some cases, the optimizing receives as input pairs of fields, each pair includes a field from the first organization's application and a field from the second organization's application and computing multiple optional global optimization values of multiple permutations of the pairs.

In some cases, the method further includes identifying that multiple data fields of the first organization's application are mapped to a single data field of the second organization's application.

In some cases, the method further includes performing an optimization process to select which of the multiple data fields should be mapped to the specific data field.

In some cases, at least some of the field keys and the data in the data fields of the first organization's application is provided in a language other than the language used to operate the second organization's application In another object of the invention a computerized system is provided having a memory and a processor for executing a set of instructions stored in the memory, said instructions including obtaining a second organization's application schema with data, generating a mathematical representation of the field keys and the data in the data fields of the second organization's application, extracting data from a first organization's application, processing the data from the first organization's application and data from the second organization's application, and mapping data from the first organization's application into the second organization's application schema.

In some cases, the instructions further includes executing a first similarity function between the mathematical representation representing field keys of the first organization's application and the mathematical representation representing field keys of the second organization's application, executing a second similarity function between the vector representing data in data fields of the first organization's application and the vector representing data in data fields of the second organization's application, applying a function receiving as input the outputs of the similarity functions to determine which data field of the first organization's platform matches a data field of the second organization's platform.

In some cases, the instructions further includes optimizing the mapping process between the first organization's application and the second organization's application.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art of how embodiments of the invention may be practiced.

In the drawings.

DETAILED DESCRIPTION

Figure 1:
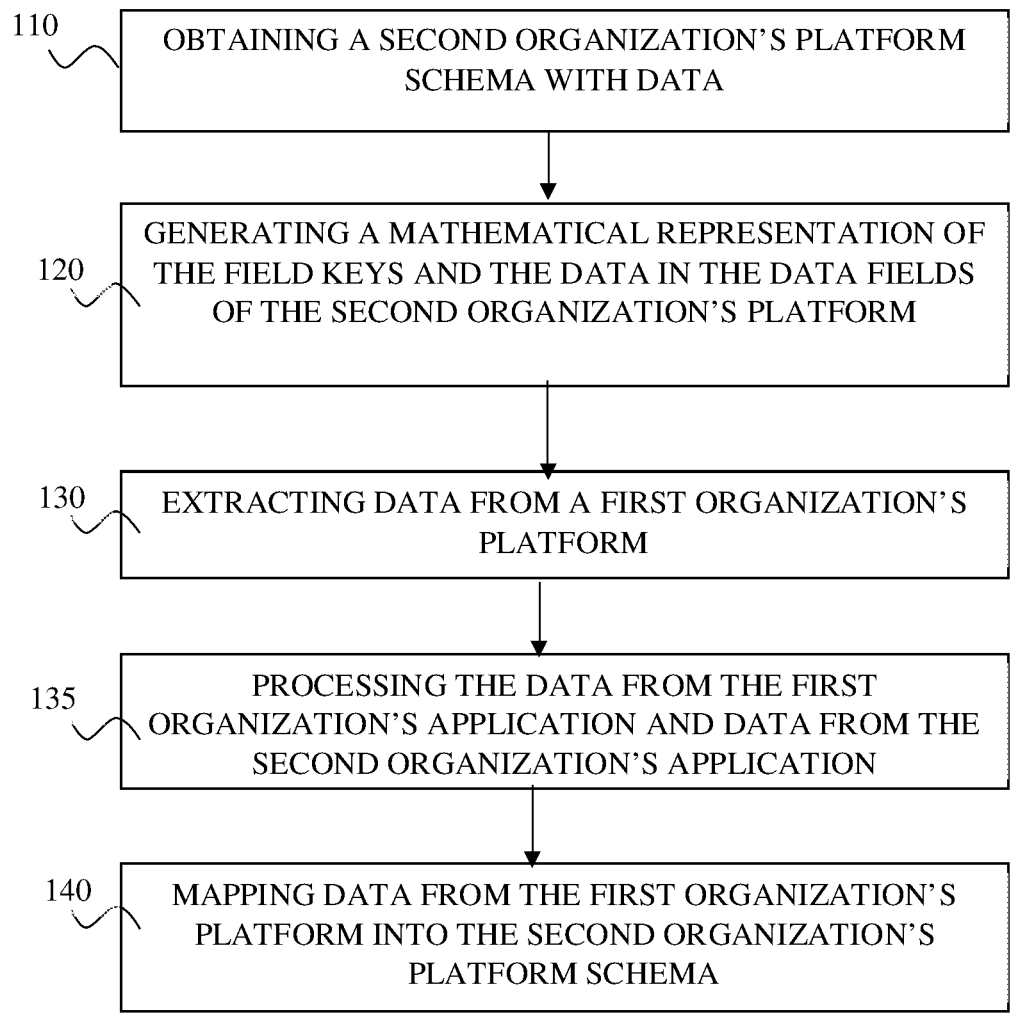
FIG. 1 shows a method for training a software model to map data into a computer software having a specific data schema, according to an exemplary embodiment of the invention.

The technical challenge solved using the invention is to convert data from one organization's application to another organization's application, in an automated manner. The application may be an organizational software for recruiting employees, an organizational software that stores and analyzes clients' business data, a software development application and the like. The organization's personnel are able to define, add, remove, or adjust the names of the fields in the application. This way, such applications are different from standard applications such as applications used by banks, in which the data fields are required to be in a specific format and have a specific name. In some cases, multiple organizations may use the same application differently, in the sense that their data is not structured in the same way, and the mapping process is therefore different.

There is a need to convert data from one organization's application to a second organization's when the second organization provides services to the first organization, without installing the application in the first organization's computers. In addition, the services provided by the second organization use rules and processes operating in a specific schema, and changing the rules to operate in other schemas require computer programmers' labor, which is relatively expensive, time consuming, and presents quality and consistency risks. Hence, there is a technical need to automate the process of translating, mapping and converting information from the first organization's application to a second organization's.

The computerized solution includes generating a mathematical representation of field names of data fields in the second organization's application. The process also includes generating a mathematical representation of data in the data fields of the second organization's application. For example, generating a first vector including data in data field #1, generating a second vector including data in data field #2, generating a third vector including data in data field #3 and so on.

Then, the method includes extracting data from the organization's application of the first organization. The data from the first organization's application is to be mapped into the application of the second organization. The data from the first organization's application includes names of the data fields, these names are also defined as field keys. The data from the first organization's application includes data in the data fields. For example, in case the first organization's application is an Applicant Tracking System (ATS), the first data field may be candidates' names, and the data in the first data field will be names, either full names, first names, last names, preferred names. Similarly, the data in the second data field may be candidates' addresses. Some organizations have a single data field to the entire address, while other organizations, using the same application, have multiple data fields, one data field for the street's name, another data field for the house's number, and a third data field for the city. In some cases, the field's name does not indicate the field's content. For example, the field in which the country of a job position is inputted is defined as a field called "custom field 7". In such cases, mapping is required to be performed according to the values of the field.

The method then generates a mathematical representation of field names or data fields in the first organization's application. The method also includes generating a mathematical representation of the data in the data fields in the first organization's application. Then, the method includes executing a first similarity function that receives as input the mathematical representation of field names or data fields in the first organization's application and the mathematical representation of field names or data fields in the second organization's application. Then, the method includes executing a second similarity function that receives as input the mathematical representation of field names or data fields in the first organization's application and the mathematical representation of field names or data fields in the second organization's application. Then, based on the two similarity functions, the method includes providing a value indicating which data field in the first organization's application should be translated into a specific data field in the second organization's application.

The method may be part of an ETL (Extract, Transfer, Load) process, in which data is extracted from the first organization's application in a first format, the data is then converted into another format and loaded into a second organization's application. The processes disclosed herein may be defined as an optimization/automation of the transfer part of the ETL.

The term "organization" refers to a company, a school, a firm, a non-profit organization (NGO), a computerized network, infrastructure, government-related entity having electronic equipment and the like.

The term "computer application" refers to a computer program designed to carry out a specific task other than a task relating to the operation of the computer itself, typically to be used by end-users, for example, word processors, Software as a Service (SaaS) applications, and accounting software. The collective noun refers to all applications collectively. The term "mapping"—refers to a process in which data is translated from one application to another. that is, data field #2 in the first application is data field #14 in the second application. The data in data field #2 in the first application can thus be used accurately in the processes executed by the second organization's application.

FIG. 1 shows a method for training a software model to map data into a computer software having a specific data schema, according to an exemplary embodiment of the invention. The model may be a Machine learning model.

Step 110 discloses obtaining a second organization's application schema with data. The schema defines the number of data fields in the application, inter-relations between the data fields, names of the data fields, technical requirements of the data fields and the like. For example, some data fields require inputting only letters, other data fields require only files or URLs, other data fields require a combination of letters and numbers (such as address), some data fields require input of dates and the like. The inter-relations may be between a date, for example a year, and details about a person's education. For example, candidate #34 studied in a certain university between 2008 and 2012.

Step 120 discloses generating a mathematical representation of the field keys and the data in the data fields of the second organization's application. The mathematical representation may be generated using a technique desired by a person skilled in the art. Some options for creating the mathematical representation include: 1. Bag of Words (BOW)—creating a vector that is affected by the distribution of the words that appear in values of the field and their counts (terms frequency). 2. Term Frequency—Inverse Document Frequency (TF-IDF)—the distribution of words in this field relative to the general distribution of words in all fields. 3. Build a vector using embedding methods such as word2vec, transformer algorithms such as Bidirectional Encoder Representations from Transformers (BERT), neural networks and the like.

Step 130 discloses extracting data from a first organization's application. The application may be an Applicant Tracking System (ATS), or other applications that enable an organization's personnel or software to update data fields, such as data fields' names, properties and the like. The data extracted from the first organization's application may be candidates' data and text representing job descriptions of open positions. The candidates' data may comprise structured resumes or profiles or unformatted information inputted into a document or into a form or fields or even images of resumes or a person's past project or any other way to understand candidate abilities. The candidates' data may comprise data fields filled by the candidate or by another person or computerized entity.

Step 135 discloses processing the data from the first organization's application and data from the second organization's application. This process is elaborated in FIGS. 2 and 3. The processing may include generating a mathematical representation of the field keys and the data in the data fields of the first organization's application and comparing the mathematical representation of the first organization's application with the mathematical representation of the second organization's application.

Step 140 discloses mapping data from the first organization's application into the second organization's application schema. After the mapping process, each data field in the first organization's application is matched to a data field in the second organization's application. This way, data from the first organization's application can be copied into memory addresses of specific data fields of the second organization's application in an automated manner, enabling the second organization's application to apply rules and processes on the data of the first organization's application without investing human labor.

In some cases, at least a portion of the data in the first organization's application is different from the language used to operate the second organization's application. For example, the first organization's application includes names and fields' names in Chinese while the second organization's application operates in English or Japanese only. Hence, the data in a first language is mapped from a first organization's application to a second organization's application operating in a different language. This may be achieved by training the software model that performs the processes disclosed herein to process data in multiple languages. The model learns to create a mathematical representation from data in multiple languages. This way, when a need arises to map data in that language, the model is already ready to process such data according to embodiments of the invention.

In some cases, mapping of data includes mapping of data from multiple raw fields in the first organization's application into a single field in the second application's application. For example, mapping of year and month into a date field. Mapping multiple data fields of the first organization's application may be implemented by creating a combined value of the raw data from the first organization's application and create the vector over the distribution of combined values. For example, in case the data field "year" has a value of "1996" and data field "month" have a value of "10", the method includes combining the values into a single value, for example "10/1996" and create the mathematical representation of the combined values.

Figure 2:
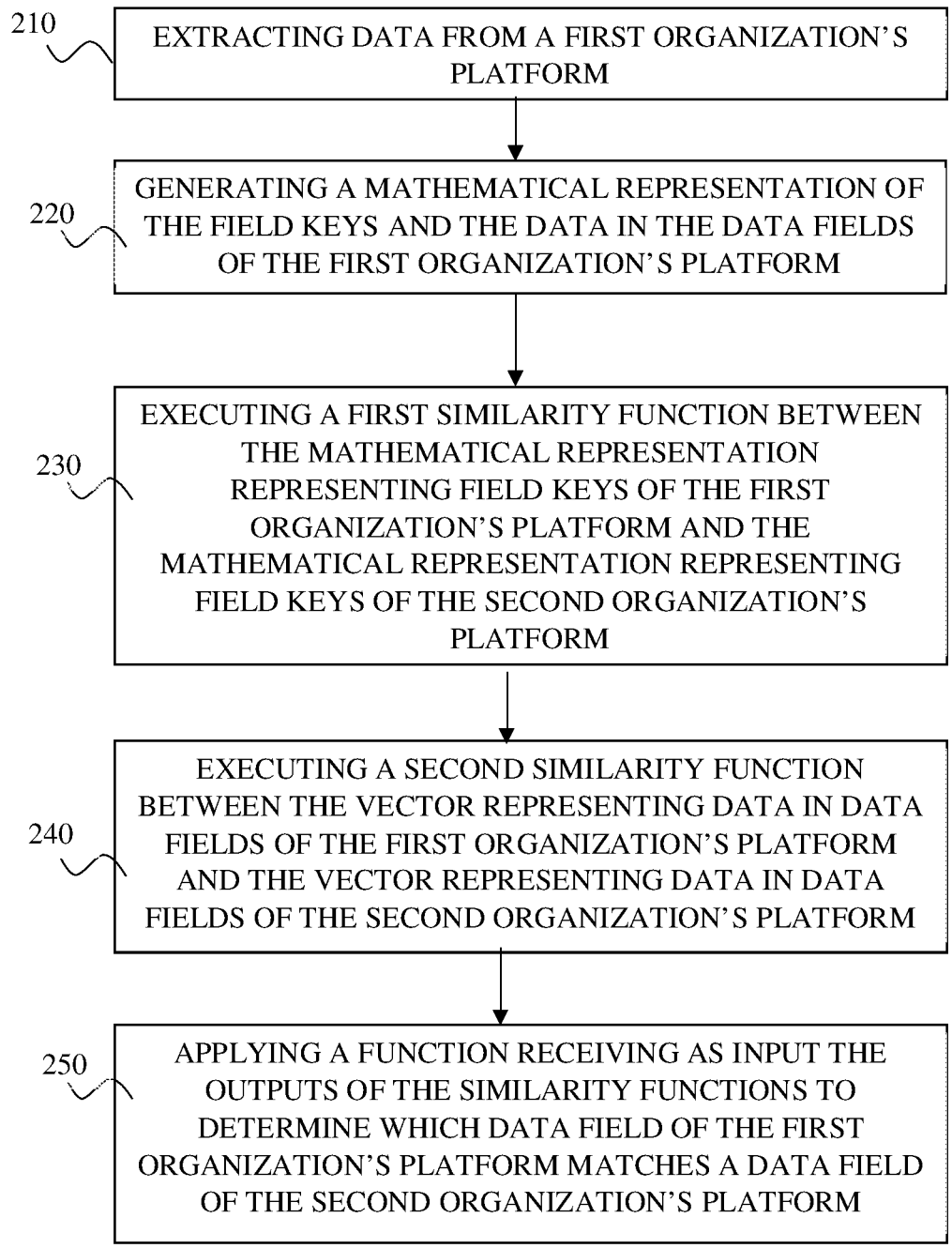
FIG. 2 shows a method for determining how to map data from a first organization's application into a computer software having a specific data schema, according to an exemplary embodiment of the invention.

FIG. 2 shows a method for determining how to map data from a first organization's application into a computer software having a specific data schema, according to an exemplary embodiment of the invention.

Step 210 discloses extracting data from a first organization's application. The data extraction process may involve an intermediate extracting system communicating with the first organization's application and with the second organization's application. Extracting the data may comprise copying raw data, files, links to web pages, financial transactions, business rules employed by the first organization, organizational permissions of the first organization, and the like.

Step 220 discloses generating a mathematical representation of the field keys and the data in the data fields of the first organization's application. The mathematical representation may be generated using a technique desired by a person skilled in the art. Some options for creating the mathematical representation include: 1. Bag of Words (BOW)—creating a vector that is affected by the distribution of the words that appear in values of the field and their counts (terms frequency). 2. Term Frequency—Inverse Document Frequency (TF-IDF)—the distribution of words in this field relative to the general distribution of words in all fields. 3. Build a vector using embedding methods such as word2vec, transformer algorithms such as Bidirectional Encoder Representations from Transformers (BERT), neural networks and the like. In some cases, at least some of the field keys and the data in the data fields of the first organization's application is provided in a language other than the language used to operate the second organization's application.

Step 230 discloses executing a first similarity function between the mathematical representation representing field keys of the first organization's application and the mathematical representation representing field keys of the second organization's application.

The similarity function may be a cosine similarity function, in which vectors' similarity is computed according to an angle between the vectors—the distance is smaller when the angle is small. Another option for implementing the similarity function is using Norm based similarities: L1, L2, L∞, etc. Another option for implementing the similarity function is using a machine learning model (e.g., a neural network) that learns the distance between two vectors using supervised learning on a training set.

Step 240 discloses executing a second similarity function between the vector representing data in data fields of the first organization's application and the vector representing data in data fields of the second organization's application. The second similarity function may be identical to the first similarity function. The second similarity function may be different from the first similarity function.

Step 250 discloses applying a function receiving as input the outputs of the similarity functions to determine which data field of the first organization's application matches a data field of the second organization's application.

The mapping process may be applied by several field types, such as string, Boolean, date, integer, float and the like. The model may apply different techniques for different field types when creating the mathematical representation AND/OR when executing the similarity functions. For example, the model may transfer Boolean values into "false" and "true" (as strings) and use the string algorithm. For float type values the model truncate them into buckets (for example 2 decimal digits) and handle the buckets as strings, or create a statistical distribution from the values.

Figure 3:
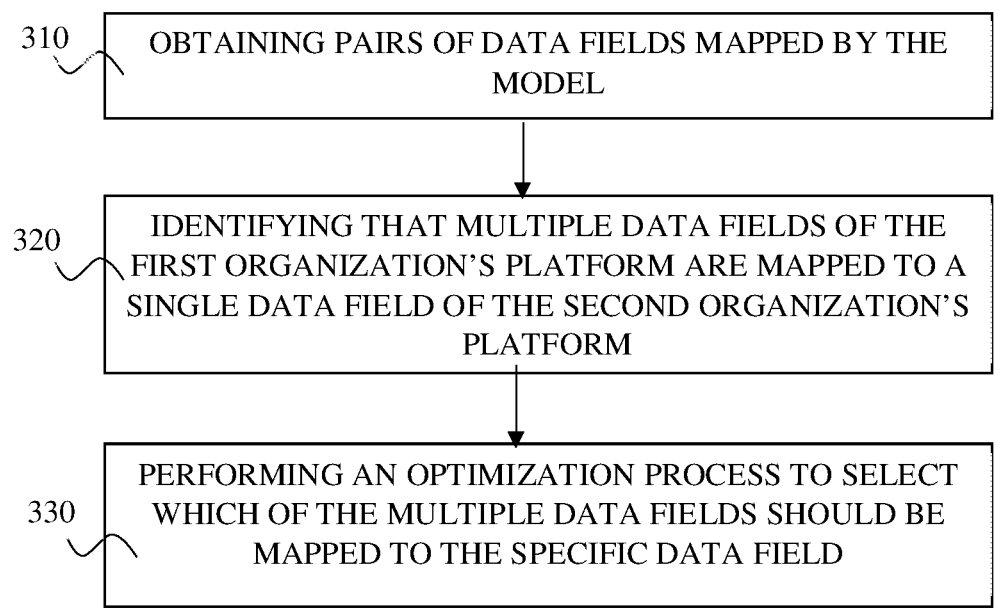
FIG. 3 shows a method for optimizing the mapping process between the first organization's application and the second organization's application, according to an exemplary embodiment of the invention.

FIG. 3 shows a method for optimizing the mapping process between the first organization's application and the second organization's application, according to an exemplary embodiment of the invention. This process may be defined as global optimization of fields mapping, as the target is to find the best mapping of all the data fields of the first organization's application.

Step 310 discloses obtaining pairs of data fields mapped by the model. In some cases, the mapping process is performed separately for each data field in the first organization's application. In such case, the pairs mapped by the model are in the following logic:

field #1 of application #1->field #4 of application #2
field #2 of application #1->field #3 of application #2
field #3 of application #1->field #1 of application #2
field #4 of application #1->field #3 of application #2

Step 320 discloses identifying that multiple data fields of the first organization's application are mapped to a single data field of the second organization's application. It can be seen that both fields #2 and field #4 of the first application are mapped to field #3 of the second application.

Step 330 discloses performing an optimization process to select which of the multiple data fields should be mapped to the specific data field. The optimization process may comprise comparing the similarity values in a pairwise method to make distinct decisions in an optimal way. For example, compare (the similarity between field #2 of first application and field #3 of second application+similarity between field #4 of first application and field #2 of second application) with (the similarity between field #2 of first application and field #2 of second application+similarity between field #4 of first application and field #3 of second application), computing which total similarities are higher, when one of the fields of first application is mapped with field #2 of second application.

In some cases, the method includes computing a function of the similarity of vectors between each pair, resulting in a "quality of fields mapping" which can be optimized to achieve optimal mapping of fields. For example, use a greedy algorithm that tries to replace some of the mappings in a way that improves the optimization measure.

The processes described above are performed by a computerized system or device, for example a server, a laptop, a tablet computer, or a personal computer. The computerized system or device includes a processor that manages the processes. The processor may include one or more processors, microprocessors, and any other processing device. The processor is coupled to the memory of the computerized system or device for executing a set of instructions stored in the memory.

The computerized system or device includes a memory for storing information. The memory may store a set of instructions for performing the methods disclosed herein. The memory may also store the candidates' data, the training set, the test set, rules for building the software model and the like. The computerized system or device may also comprise a communication unit for exchanging information with other systems/devices.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings provided herein without departing from the essential scope thereof. Therefore, it is intended that the invention not be limited to the particular embodiments disclosed herein.

What is claimed is:

1. A computer implemented method for mapping data from a first computer application to a second computer application, the method comprising:
   obtaining, a second organization's computer application schema with data;
   generating, by a computerized system or device and using a bidirectional encoder representations from transformers (BERT) model, a mathematical representation of field keys and the data in data fields of the second organization's application;
   generating, by the computerized system or device and using the BERT model, a mathematical representation of field keys and data in data fields of a first organization's computer application;
   executing, via the computing device, a first similarity function between the mathematical representation representing the field keys of the first organization's application and the mathematical representation representing the field keys of the second organization's application;
   executing, via the computing device, a second similarity function between the mathematical representation of the data in the data fields of the first organization's application and the mathematical representation of the data in the data fields of the second organization's application; and applying, via the computing device, a function that receives as an input the outputs of the first similarity function and the second similarity function to output multiple pairs of data fields, each pair comprises a data field of the first organization's platform and a data field of the second organization's platform;

performing, by the computerized system or device, an optimization process to select which of a plurality of multiple data fields of the first organization's application should be mapped to a specific data field of the second organization's application, wherein the optimization process comprises receiving as input pairs of fields, each pair comprises a field from the first organization's application and a field from the second organization's application and computing multiple values for multiple permutations of the pairs, and wherein the optimization process comprises a greedy algorithm, the algorithm replacing one or more mappings to improve an optimization measure;

mapping data by the computerized system or device, from the first organization's application into the second organization's application schema according to an output of the function that received as input the outputs of the first similarity function and the second similarity function, wherein the mapping comprises matching a data field in the first organization's application to a data field in the second organization's application; and using the mapped data in an extract, transfer, load (ETL) process executed by the second organization's application.

2. The method of claim 1, wherein the first computer application is an Applicant Tracking System (ATS), a CRM (Candidate Relationship Management), a HCM (Human Capital Management), a LMS (Learning Management System) or a VMS (Vendor Management System).

3. The method of claim 1, wherein the second organization's application schema defines at least one of: a number of the data fields in the second computer application, interrelations between the data fields, names of the data fields, and technical requirements of the data fields with data.

4. The method of claim 1, wherein the processing comprises comparing a mathematical representation of the first organization's application with the mathematical representation of the second organization's application.

5. The method of claim 1, wherein the mapping of data comprises mapping of data from multiple raw fields in the first organization's application into a single field in the second application's application.

6. The method of claim 1, wherein generating the mathematical representation of the field keys and the data in the data fields of the first organization's application comprises creating a vector according to a distribution of words that appear in values of the field keys and the data in the data fields and counts of the words.

7. The method of claim 1, wherein at least one of the first similarity function and the second similarity function is a cosine similarity function.

8. The method of claim 1, wherein mapping at least two different field types.

9. The method of claim 1, further comprising optimizing the mapping process between the first organization's application and the second organization's application.

10. The method of claim 9, wherein the optimizing is a global optimization of fields mapping.

11. The method of claim 9, further comprising identifying that multiple data fields of the first organization's application are mapped to a single data field of the second organization's application.

12. The method of claim 1, wherein at least some of the field keys and the data in the data fields of the first organization's application is provided in a language other than the language used to operate the second organization's application.

13. The method of claim 1, wherein the first computer application comprises more data fields than the second computer application.

14. The method of claim 1, wherein the optimization process comprises comparing the similarly values in a pairwise method.

15. The method of claim 14, wherein the optimization process comprises computing which total similarities are higher to determine which of the multiple data fields of the first organization's application should be mapped to the specific data field of the second organization's application.

16. A computerized system comprising:
a memory; and
a computing device for executing a set of instructions stored in the memory, the computing device configured to:
obtain a second organization's computer application schema with data;
automatically generate, using a bidirectional encoder representations from transformers (BERT) model, a mathematical representation of field keys and the data in data fields of the second organization's application;
automatically generate, using the BERT model, a mathematical representation of field keys and data in data fields of a first organization's computer application;
execute a first similarity function between the mathematical representation representing the field keys of the first organization's application and the mathematical representation representing the field keys of the second organization's application;
execute a second similarity function between the mathematical representation of the data in the data fields of the first organization's application and the mathematical representation of the data in the data fields of the second organization's application; and
apply a function that receives as input the outputs of the first similarity function and the second similarity function to output multiple pairs of data fields, each pair comprises a data field of the first organization's platform and a data field of the second organization's platform;
automatically perform an optimization process to select which of a plurality of multiple data fields of the first organization's application should be mapped to a specific data field of the second organization's application, wherein the optimization process comprises receiving as input pairs of fields, each pair comprises a field from the first organization's application and a field from the second organization's application and computing multiple values for multiple permutations of the pairs, and wherein the optimization process comprises a greedy algorithm, the algorithm replacing one or more mappings to improve an optimization measure;
automatically map data from the first organization's application into the second organization's application schema according to an output of the function that received as input the outputs of the first similarity function and second similarity function, wherein the mapping comprises matching a data field in the first organization's application to a data field in the second organization's application; and use the mapped data in an extract, transfer, load (ETL) process executed by the second organization's application.

17. The system of claim 16, wherein the instructions further comprising optimizing the mapping process between the first organization's application and the second organization's application.

\* \* \* \* \*